May 1, 1923.
G. H. WHITTINGHAM
THERMALLY CONTROLLED SWITCH
Filed July 10, 1922
1,454,022
2 Sheets-Sheet 1
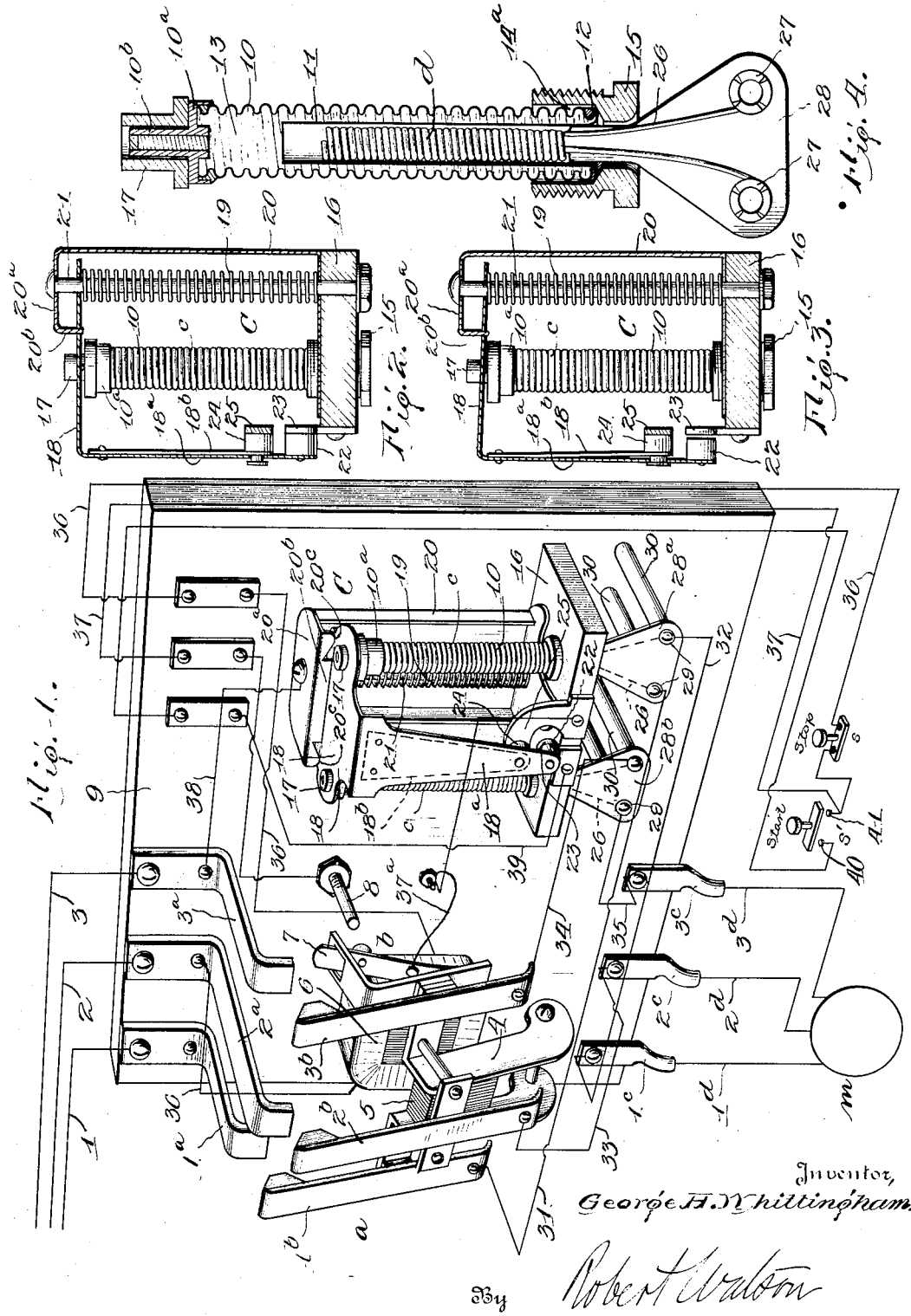
Inventor,
George H. Whittingham.
By Robert Walton
Attorney

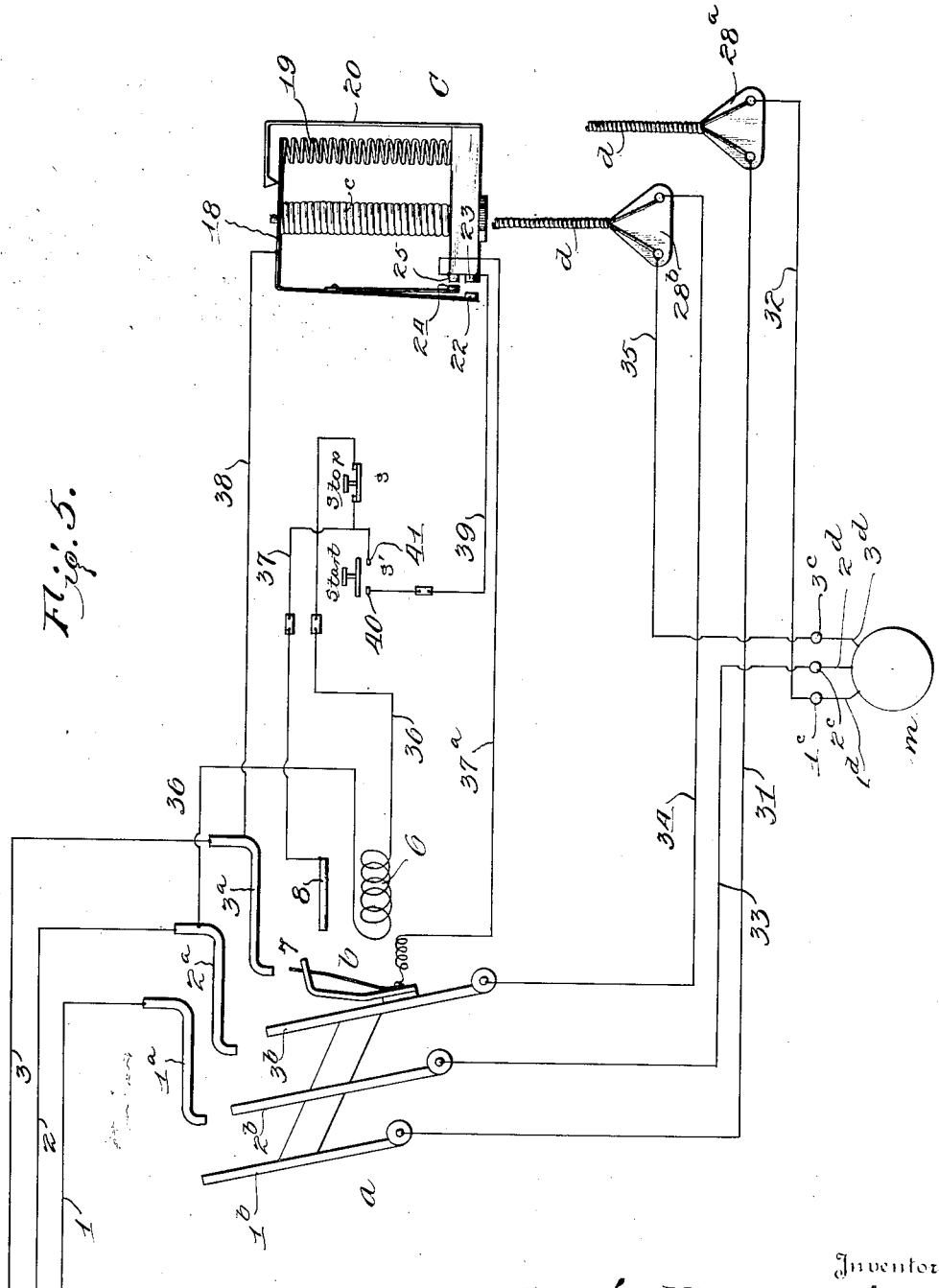

Patented May 1, 1923.

1,454,022

UNITED STATES PATENT OFFICE.

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND.

THERMALLY-CONTROLLED SWITCH.

Application filed July 10, 1922. Serial No. 573,857.

*To all whom it may concern:*

Be it known that I, GEORGE H. WHITTINGHAM, a citizen of the United States, residing at Baltimore, in the State of Maryland, have invented certain new and useful Improvements in Thermally-Controlled Switches, of which the following is a specification.

This invention relates to thermally controlled electro-magnetically operated switches adapted particularly for starting alternating current motors, and for disconnecting the motor from the supply circuit in case of overloading of the motor, or in case of such derangement of one of the circuits of a multi-phase motor as would cause excessive current to flow in the other circuits of the motor.

In carrying out the invention, I provide a main switch for connecting the motor leads to the supply wires, an auxiliary switch associated with the main switch, a magnet for closing said switches, a thermal limit relay having one or more heating elements in series with one or more of the motor windings, said relay having two sets of contacts, one set adapted to open before and close after the other, a circuit for initially energizing the magnet to close the switch, said circuit including start and stop push buttons and the first mentioned relay contacts, and a holding circuit for the magnet comprising the other set of contacts, the auxiliary switch and the closed push button switch. The arrangement is such, that should the current flow through one of the heating elements be sufficient to actuate the relay, the latter will first open one set of contacts, thereby disconnecting the start push button switch from one leg or side of the supply circuit and then open the other set of contacts, thereby interrupting the circuit through the magnet and causing the main and auxiliary switches to open. As the expansion members of the relay cool and contract, the contacts thereon which are first closed make up the holding circuit for the magnet to the auxiliary switch, which is open, and the contacts which are second to close make up the circuit to the magnet through the start push button switch. With this arrangement, the holding circuit for the magnet is made up to the auxiliary switch through firmly closed contacts on the relay before the magnet can be initially energized by the depression of the start switch, since the latter is in series with the contacts of the relay which are last to close. At any time after the latter contacts have actually closed, depression of the start push button switch will initially close the circuit through the magnet and the main and auxiliary switches will close, the latter completing the holding circuit so that the switches will remain closed. If the circuit to the magnet were initially made and also maintained through a single set of thermal relay contacts, difficulty would be experienced in closing the magnet circuit if the operator should close the start push button switch at the instant when the slowly moving contacts of the relay were first engaging, owing to the fact that the inrush current of the motor would cause heating of the expansion elements and the contacts would move apart, causing chattering of the switch magnet instead of a positive operation of the main switch.

In the accompanying drawing,

Fig. 1 is a perspective view of an electro-magnetically operated switch associated with a thermally operated relay, the switch and relay constituting a starter for alternating motors, the circuit connections for operating the multi-phase motor being shown conventionally;

Fig. 2 is a central vertical section through the relay, taken on a line passing from front to rear, the relay contacts being closed;

Fig. 3 is a similar view, showing one pair of contacts closed and the other pair open;

Fig. 4 is a central section through one of the expansion units of the relay; and Fig. 5 is a simplified diagram of the circuits shown in Fig. 1.

Referring to the drawing, $a$ indicates an electro-magnetic main switch for connecting and disconnecting the motor $m$ from the supply wires 1, 2, 3, of a three-phase alternating current power circuit. The main switch comprises the stationary contacts $1^a$, $2^a$, $3^a$ and the switch arms $1^b$, $2^b$, $3^b$, adapted to engage said contacts, respectively. These switch arms are mounted upon a hinged frame 4, which carries an armature 5, arranged in front of the pole piece of a magnet 6. The switch is normally held in open position by gravity and is movable to closed position by the attraction of the magnet, when the latter is energized. An auxiliary switch $b$ is adapted to be closed by the magnet practically at the same time as the main switch. This auxiliary switch comprises a spring switch arm 7, carried by the main switch, and a stationary contact 8, mounted upon the switch base 9. The function of the switch $b$ is to maintain a circuit through the coil of the holding magnet 6 after the magnet has been momentarily energized by the closure of its circuit through a push button switch and has attracted the main and auxiliary switch arms to their closed positions.

The parts thus far described are old in the art and are illustrated in more or less of a conventional way in the drawing.

The switch arms $1^b$, $2^b$, and $3^b$ are connected by conductors to be described to the terminals $1^c$, $2^c$, and $3^c$, from which conductors $1^d$, $2^d$, and $3^d$, respectively, lead to the terminals of a multi-phase motor $m$. A thermal limit relay for controlling the opening and closure of the main and auxiliary switches is indicated as a whole by the letter C. The relay shown in the drawing comprises two expansible units $c$, which are alike in construction, each unit consisting of an outer annularly corrugated tube 10, of thin metal, and an inner tube 11, the latter having its inner end closed and having its outer end connected to the adjacent end of the tube 10 by a fluid-tight joint 12. The free end of the tube 10 is closed by a cap $10^a$, having a plugged nipple $10^b$ which projects beyond the cap. The tube 10 contains a liquid 13 which expands when heated and causes the elongation of the tube. These expansible units fit into the sockets $14^a$ of adjusting nuts 15, which latter are made of insulating material and are threaded into suitable openings in the base 16 of insulating material. Upon each cap $10^a$ is loosely fitted a sleeve or bushing 17, of insulating material, and this bushing extends through an opening in the horizontal part of a lever 18, which is supported above the base by the expansion units and by a compression spring 19. As shown, a bracket 20 is secured to the base 16 and projects upwardly therefrom at the rear of the expansion units, and this bracket has a forwardly turned part $20^a$ and a downwardly turned tongue $20^b$, the central part of which projects into a slot in the horizontal part of the lever 18, to position the latter, while the sides $20^c$ of the tongue form fulcra for the lever at the rear of the expansion units. The spring 19 is coiled about a bolt 21, which extends through the base and through openings in the lever and in the part $20^a$ of the bracket. This spring constantly presses upwardly on the lever at the rear of its fulcrum point and causes the part of the lever at the front of said point to bear downwardly. The lever, as shown, has a downwardly bent arm $18^a$ which carries at its lower end a contact 22, adapted to engage a fixed contact 23. Attached to the rear side of the arm $18^a$, near the upper end of the latter, is a spring arm $18^b$, which carries a contact 24, adapted to engage a stationary contact 25. The contact 24 has a limited motion with respect to the arm $18^a$ and therefore with respect to the contact 22, which is fixed on said latter arm, and the spring arm $18^b$ normally tends to hold the contact 24 away from the arm $18^a$. The arrangement is such that when the units $c$ expand, the forward part of the lever 18 will be rocked upwardly and the contact 22 will first leave the contact 25. As the units $c$ contract, the contact 24 will first engage the contact 25, and the contact 22 will then engage the contact 23. Normally, both of the movable contacts are in engagement with the stationary contacts, as shown in Fig. 2. In Fig. 3, the contact 22 is shown out of engagement with the fixed contact 23, while the contact 24 is still in engagement with the contact 25.

Within the inner tubes of the expansion units are arranged heating elements $d$, each comprising a conductor 26 coiled upon itself and connected at its ends to eyelets 27 in a support 28, of insulating material. These heating elements, thus mounted, are removable from the tubes and may be replaced by similar elements having conductors of different lengths or dimensions, according to the current which is to be carried and the time in which it is desired to have the relay open its contacts. These heating elements are connected in the motor circuit by screws 29, which pass through the eyelets 27 and into binding posts 30, which latter support the elements.

The heating elements are connected in series with two of the leads to the motor. Thus, the switch arm $1^b$ of the main switch is connected by conductor 31 to the heating element mounted on support $28^a$, and thence by conductor 32 to the terminal $1^c$ and by lead $1^d$ to the motor. The switch arm $2^b$ is connected by conductor 33 to terminal $2^c$ and thence by lead $2^d$ to the motor, and switch arm $3^b$ is connected by conductor 34 to one terminal of the heating element on support $28^b$, and thence by conductor 35 to terminal $3^c$, and thence by lead $3^d$ to the motor.

It will be evident from the foregoing, that when the main switch is closed, the current which flows to the motor through two branches of the supply circuit will flow through the heating elements, and an excessive current in either of said branches will cause the corresponding expansion unit to expand and rock the contact lever, against the action of the compression spring, causing the relay contacts to open in succession. This action will cause the magnet of the main witch to become de-energized and the main switch will drop to open position and cut off the current from the motor and the heating elements. When the fluid in the expansion tubes cools, the tubes will shorten and the contact lever will rock to the position shown in Fig. 2, wherein the contact pieces on the lever engage the stationary contact pieces, the contacts 24 and 25 engaging before the engagement of the contacts 22 and 23.

The circuit for the holding magnet 6 extends from one of the line terminals $2^a$ by conductor 36 to the magnet coil and thence to a normally closed push button switch $s$, and thence by conductor 37 to the stationary contact 8 of the auxiliary switch $b$, which switch is normally open, thence by conductor $37^a$ to the stationary contact 25 on the relay, thence through contact 24, lever 18 and conductor 38 to the supply wire terminal $3^a$. Normally, no current can flow through the magnet coil even though the relay contacts are closed because the circuit is open at the auxiliary switch. The contacts 22 and 23 of the relay connect the supply wire terminal $3^a$, through conductor 38 and relay lever 18, and conductor 39 with one terminal 40 of a normally open push button switch $s'$. The other terminal 41 of said switch is connected through the closed push button switch $s$ to the magnet coil and the supply wire terminal $2^a$ by conductor 36, and it is also connected by conductor 37 to the terminal 8 of the auxiliary switch $b$.

The operation is as follows. Normally, the contacts on the relay are closed, as indicated in Fig. 2, and the main and auxiliary switches are open, as indicated in Fig. 1. The start push button switch $s'$ stands normally open and the stop push button switch $s$ is normally closed. In order to start the motor, the operator momentarily closes the push button switch $s'$ and this closes a circuit through the magnet coil from the supply wire terminal $3^a$ through conductor 38, lever 18, contacts 22 and 23, conductor 39, switches $s'$ and $s$, and conductor 36 to the supply wire terminal $2^a$. The magnet thus becomes energized and closes the main and auxiliary switches, the former connecting the motor and the thermal elements to the supply circuits and the latter completing the holding circuit for the magnet so that the latter will keep the switches in closed positions after the release of the start push button switch. The holding circuit extends from the line terminal $3^a$ through conductor 38 to the lever 18, thence through relay contacts 24 and 25 to conductor $37^a$, thence through switch members 7 and 8 of the switch $b$, and thence by conductor 37 to conductor 36, through stop switch $s$, and through the magnet coil to the line terminal $2^a$. The magnet circuit will thus remain complete through auxiliary switch $b$ and relay contacts 24 and 25, until the latter contacts are moved apart by the relay, or until the magnet circuit is voluntarily broken by the opening of the stop switch $s$, which is in series with the magnet coil. If the current through one or both of the heating elements should be sufficient to move the lever 18 to separate the relay contacts, the contacts 22 and 23 will first separate, but this separation will not affect the operation of the apparatus as the circuit which these contacts control is normally open at the start switch and no current flows through it. Further movement of the lever 18 will cause the contact 24 to move away from the contact 25, and as these contacts are in series with the magnet coil, the latter will be de-energized and the main and auxiliary switches will drop to open position. The contacts 24 and 25 therefore determine the moment when the main switch will open and stop the motor. As the heating elements and the liquid within the expansion elements cool, the latter will contract and the lever 18 will rock in the direction to close the relay contacts. The contacts 24 and 25 will first engage and these contacts will make up the circuit from the latter contact to auxiliary switch arm 7, but as the auxiliary switch is open no current can flow to the magnet coil. As the expansion tubes in the relay further cool, the contacts 22 and 23 will be brought slowly together and a circuit will thus be established to the contact 40 of the start switch. If the start switch is now closed, a circuit through the magnet coil will be completed from line terminal $3^a$, through conductor 38, lever 18, contacts 22 and 23, conductor 39, the start switch, the stop switch, and conductor 36 to the coil and thence to the line terminal $2^a$. The main and auxiliary switches will then immediately close and this will cause the holding circuit before described to be completed through auxiliary switch $b$ and relay contacts 24 and 25. It will thus be seen that the current flows through contacts 22 and 23 only momentarily, while the start push button is being depressed, and that thereafter the current for the magnet flows through contacts 24 and 25. Evidently, the motor cannot be started so long as the relay contacts 22 and 23 are separated. If the start push button should be depressed at the moment when the contact 22 is closing against the contact 23, the inrush current through the heating elements would cause an expansion of the tubes and an opening of the circuit established at said contacts, and if the only circuit to the magnet coil were through these contacts, the current through the coil would flutter and cause chattering of the magnet. But with the arrangement shown and described, if the operator closes the start push button at the moment when the contact 22 is engaging the contact 23, current will flow momentarily through the magnet circuit and the main and auxiliary switches will close, and the closure of the latter switch will complete the magnet circuit through the contacts 24 and 25 of the relay and the main and auxiliary switches will remain closed. Any separation of the contact 22 from the contact 23, caused by the inrush current flowing through the heating elements, will not effect the magnet. Thus, by providing the two sets of contacts on the relay, one set in series with the magnet coil and the auxiliary switch, and the other set in series with the magnet and the push button switch and by arranging these sets of contacts so that the first mentioned set will close before and open after the last mentioned set, chattering and uncertain action of the main switch is avoided.

What I claim is:

1. The combination with normally open main and auxiliary switches and a magnet for closing the same, of a thermostat relay having two sets of contacts adapted to open successively when the thermostat is heated, a normally open start switch, a circuit for initially energizing the magnet including the relay contacts first to open and the start switch, and a holding circuit for the magnet including the relay contacts last to open and the auxiliary switch.

2. The combination with normally open main and auxiliary switches, a magnet for closing the same, a motor and circuits connecting the motor with the main switch, of a thermostat relay having a heating element in one of the motor circuits, said relay having two sets of contacts adapted to open successively when the thermostat is heated by said element, a normally open start switch, a circuit for intially energizing the magnet including said start switch and the relay contacts first to open, and a holding circuit for the magnet including said auxiliary switch and the relay contacts last to open.

3. The combination with normally open main and auxiliary switches, a magnet for closing the same, a motor, and circuits connecting the motor with the main switch, of a thermostat relay comprising a plurality of heating elements, each in a separate motor circuit, separate expansion elements associated with the heating elements, a contact member common to said expansion elements and two sets of normally closed contacts controlled by said member and adapted to open successively, two circuits for the magnet, one including the contacts last to open and the auxiliary switch and the other including the contacts first to open, and a normally open start switch in the last mentioned circuit.

4. The combination with normally open main and auxiliary switches, a magnet for closing the same, and a motor connected to the main switch, of a relay for controlling the magnet comprising a closed expansible tube containing an expansible liquid and a socket within the tube, a heating element in said socket and connected in one of the motor circuits, a contact member movable by said tube and a holding circuit for the magnet extending through said auxiliary switch and controlled by said member.

5. The combination with normally open main and auxiliary switches, a magnet for closing the same, and a motor connected to the main switch, of a relay for controlling the magnet comprising a closed expansible tube containing an expansible liquid and a socket within the tube, a heating element in said socket and connected in one of the motor circuits, a contact member movable by said tube, two sets of contacts adapted to be opened in succession by said members when the tube expands, a holding circuit for the magnet including the contacts last to open and the auxiliary switch, a circuit for the magnet including the contacts first to open, and a normally open start switch in the last mentioned circuit.

In testimony whereof I affix my signature.

GEORGE H. WHITTINGHAM.